US007037545B2

United States Patent
Finnie et al.

(10) Patent No.: US 7,037,545 B2
(45) Date of Patent: *May 2, 2006

(54) MULTI-STAGE THICKENING COMPOSITION FOR USE WITH PACKAGED FOOD ITEMS AND PROCESS FOR USING SAME

(75) Inventors: Kevin J. Finnie, Webb City, MO (US); Robert L. Olsen, Tempe, AZ (US); Susan C. Frinak, Green Bay, WI (US)

(73) Assignee: Schreiber Technologies, Inc., Green Bay, WI (US)

( * ) Notice: Subject to any disclaimer, the term of this patent is extended or adjusted under 35 U.S.C. 154(b) by 622 days.

This patent is subject to a terminal disclaimer.

(21) Appl. No.: 10/095,330

(22) Filed: Mar. 11, 2002

(65) Prior Publication Data

US 2002/0142076 A1    Oct. 3, 2002

Related U.S. Application Data (63) Continuation of application No. 09/356,786, filed on Jul. 20, 1999, now Pat. No. 6,391,358.

(51) Int. Cl.
*A23L 1/06* (2006.01)
*A23L 1/05* (2006.01)

(52) U.S. Cl. ............... 426/410; 426/412; 426/392; 426/106; 426/573; 426/576; 426/577; 426/589

(58) Field of Classification Search ............... 426/414, 426/410, 573, 576, 577, 578, 582, 589, 392, 426/405, 106, 130
See application file for complete search history.

(56) References Cited

U.S. PATENT DOCUMENTS

| 4,704,293 | A | * | 11/1987 | Moore et al. | 426/573 |
|---|---|---|---|---|---|
| 4,792,457 | A | * | 12/1988 | Brna et al. | 426/574 |
| 5,057,606 | A | * | 10/1991 | Garbe | 536/54 |
| 5,063,073 | A | * | 11/1991 | Kratochvil | 426/573 |
| 5,464,645 | A | * | 11/1995 | Wesdorp et al. | 426/573 |
| 5,532,018 | A | * | 7/1996 | Miller et al. | 426/582 |
| 6,391,358 | B1 | * | 5/2002 | Finnie et al. | 426/410 |
| 6,416,805 | B1 | * | 7/2002 | Lewis et al. | 426/573 |

FOREIGN PATENT DOCUMENTS

| WO | WO 9535036 A2 * 12/1995 |
|---|---|
| WO | WO 9847390 A1 * 10/1998 |

* cited by examiner

*Primary Examiner*—Milton I. Cano
*Assistant Examiner*—Robert Madsen
(74) *Attorney, Agent, or Firm*—Brinks Hofer Gilson & Lione (57) ABSTRACT

A multi-stage thickening composition for use in facilitating the handling and continuous packaging of a food product, and for providing a desired final shape and texture for the food product. Relatively rapid-setting and slower-setting consumable gels form one preferred thickening composition. The rapid-setting gel allows the food product to be shaped and packaged, while the slower-setting gel allows the food product to be provided with desired texture characteristics that appeal to the consumer.

26 Claims, 5 Drawing Sheets

MULTI-STAGE THICKENING COMPOSITION FOR USE WITH PACKAGED FOOD ITEMS AND PROCESS FOR USING SAME

This application is a continuation of application Ser. No. 09/356,786, filed on Jul. 20, 1999, now U.S. Pat. No. 6,391,358.

BACKGROUND OF THE INVENTION

The invention generally relates to a process in which a food product to be packaged is converted from a soft, fluid-like state to a firmer state in two or more stages. More specifically, the passage of the food product through these stages is useful to provide the food product with desired flow characteristics as it moves through the packaging equipment, and for obtaining the desired finished product body and texture.

Food products which are fluid during processing, such as jelly, food sauces, and dessert gels, may be difficult to process or package. For example, if the food product is extruded, or is required to pass over rollers, its passage through a packaging machine may be physically impeded if the viscosity of the food product is too low (see, e.g., FIG. 5), also causing problems with proper weight control of the packages. Conversely, the product body and texture may be physically damaged if the viscosity is too high, as further described below.

It is known to add a thickener, such as a consumable gel, to food products. See, e.g., U.S. Pat. No. 5,567,454 to Bogdan, disclosing the use of gelatin, fruit pectin and food starch to provide jelly with "optimal flexibility and shape-retaining qualities" (col. 6, lines 12–14), and also disclosing a recessed container in which the finished product shape may be formed. However, food gels have typically been allowed to form in an undisturbed state in order to gel properly. If shear forces are applied to the gel as a result of packaging, the gel may be damaged, resulting in a fractured and unacceptable finished product, as has been described in U.S. Pat. No. 5,518,745 to Thota et. al as follows:

> A problem with utilizing a continuous extrusion process to obtain a set extrudate is that when the product begins to set within the extruder, the possibility of degradation and physical break up of the extrudate during conveyance increases after the transition of the mixed ingredients from a liquid phase to a highly viscous solid or gel phase. The high viscosity of the setting gel increases shear forces throughout the extrudate as it is conveyed through the extruder. When the final mixture of the product is shear sensitive, the extrudate tends to degrade and break apart, at least sporadically, as it is conveyed through the extrusion die, significantly limiting the ability to continuously convey, shape, form and cut the extrudate in an efficient and continuous manner.

(Col. 2, lines 7–20).

Delaying gel formation until the product is in a packaged and finally-formed state, however, may present problems during earlier stages of the packaging process. The product may simply be too thin or runny to package properly as it passes through packaging machinery, such as high-speed slice forming equipment. Thus, problems have been encountered in packaging food products that are either relatively low or high in viscosity.

Some packaging equipment has been designed to move slowly enough to accommodate gel formation. With increasing food plant size and increased equipment automation, line speeds have increased. Packaging equipment requires fast throughputs to justify equipment costs. The food products made in these plants must not only be acceptable upon shipment, but must also be able to tolerate these rapid line speeds. Packaging equipment has been specially designed to allow the passage of solid state food products (see, e.g., the Thota patent, describing the use of a low viscosity fluid continuously flowing over a channel in an extrusion die to induce laminar flow of a gelled food product). However, it would be more economical to provide food products designed to progress through existing packaging machines than to specially design machines to handle fluid food products.

In addition, packaging materials or operations may require the food product itself to provide its own structural support, e.g., when a particular shape, such as a cookie or candy, is extruded and deposited on a tray.

Various gel shapes have been described in the patent literature. See, e.g., the Bogdan patent; EPO Patent Application 99-13 0904703 to Fassin et. al., "Slice-shaped filling for sandwiches"; U.S. Pat. No. 5,417,990 to Soedjak, describing multi-layered gelled products; and U.S. Pat. No. 5,783,241 to Bocabeille et. al., "Method For Producing Cylindrical Gel Food Products", in which gelling is induced internally and externally of an extruded food product using a calcium bath. However, no provision for commercial high-speed processing and packaging of a food product using a multi-stage gel or thickener appears to be described.

Accordingly, it is an object of the present invention to provide a gelling or thickening system which will introduce sufficient integrity to a food product so as to facilitate packaging of the food product.

It is another object of the invention to provide a multi-stage gelling/thickening system that provides the food product with sufficient viscosity during all relevant stages of food product formation and/or food product packaging, while also imparting desired shape and texture characteristics to the food product.

It is a further object to provide a gelling/thickening system adaptable for use with existing packaging machines, such as extruder machines for packaging individual slices of food items, without the need to specially re-design such machines.

It is yet another object to provide a gelling/thickening system which provides a food product with desired viscosity to allow proper weight control over the food product packages.

It is still another object to provide a multiple-stage gelling/thickening system which is consumable, cost-efficient and environmentally friendly.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Gel" is used here as that term is normally understood to those of ordinary skill in the art, and refers to a colloid in a form more solid than a sol.

"Gelling agent" means a substance(s) that causes or facilitates the formation of a gel.

"Set" means for a gelled product to reach a substantially constant viscosity.

"Thickeners" mean constituents for increasing the viscosity of a food product, using, including gelling and non-gelling agents.

"Package" means any encapsulation or covering for a food product.

"Compatible" or "Compatibility" means that two or more gels or thickening agents present in the same food product will not interfere with the gelling or thickening process of the other(s) in a manner that is substantially deleterious to packaging of the food product or its consumer appeal.

"Food Product" means any edible or consumable product.

"Jelly" means any gelled food product, including all types of jellies, jams, preserves, marmalades, fruit butters, desert gels, gelatin slices, and the like.

"Disrupt" or "disrupted" means an interference with the texture of the thickening or gelling agent composition or food matrix.

"Texture" means the physical sensation of a food product as it interacts with the human senses, including its appearance and its mouth-feel upon mastication.

"Enable" or "enabling" means to simply provide an environment for a reaction or change as well as to cause that change using chemical or other means.

SUMMARY OF THE INVENTION

The objects mentioned above, as well as other objects, are solved by the present invention, which overcomes disadvantages of prior art thickener or gelling systems, while providing new advantages not previously obtainable.

This invention has its genesis in the surprising finding that two or more gelling or thickening agents may be added to a food product, with a first (e.g., rapid-setting) gel or thickening agent providing the necessary viscosity for entry and shaping of the food product in continuous packaging equipment. The first gel or thickening agent may be deformed and dynamically disrupted through this packaging process. This disruption, as may be evidenced by an inconsistent, non-uniform, lumpy and/or granular texture formation, for example, consisting of a gel phase and a viscous liquid phase, is believed contrary to general practices in gelled food manufacturing, which typically require a quiescent thickener/gel setting. A second (e.g., slow-setting) gel or thickener may be used to "mask" or limit this disruption, allowing the formation of a firm, elastic, continuous food product.

In one embodiment of the present invention, a food product to be continuously packaged by a packaging machine is to be provided with a desired texture. The food product includes a multi-stage thickening composition, including preferably compatible first and second thickening agents. The first thickening agent, which may but need not be a gelling agent, increases the viscosity of the food product so as to facilitate packaging of the food product. In other words, as one example, the food product viscosity is sufficiently increased by the first thickening agent to avoid the problem shown in FIG. 5. The first thickening agent is then disrupted in a manner that interferes with the provision of the desired texture of the food product. The second thickening agent permits the food product to be provided with the desired texture following the disruption of the first thickening agent.

In a preferred embodiment, the food product takes the form of a slice wrapped in a plastic film. In a particularly preferred embodiment, the food product slice is hermetically sealed within the plastic film.

As non-limiting examples, food products which may find advantageous use with the principles of the present invention include jelly, food sauces and dessert gels.

As non-limiting examples, first or more rapid thickening or gelling agents which may be used to advantage with the present invention include pectin and Konjac gum. Also as a non-limiting example, a second or slower-setting thickening or gelling agent which may be used to advantage with the present invention is gelatin.

In a preferred embodiment, using a vertical form and fill machine for packaging individually wrapped food products in slices, the viscosity of the food product immediately prior to insertion of the food product within the plastic packaging film is about 5,000 centipoise or less, while the viscosity of the food product following gelling of either first or second gelling agents is about 100,000 centipoise or greater.

The present invention also includes a process for forming a food product to be packaged in a continuous packaging operation, and with a desired shape and texture. First, a food product that includes a multi-stage thickening composition with first and second thickening agents is dispersed within other constituents of the food product. Heating of the food product mixture may also occur at this time. The first thickening agent is permitted to increase the viscosity of the food product so as to facilitate shaping and packaging of the food product. The first thickening agent is then disrupted in a manner that interferes with provision of the desired texture of the food product. Next, the second thickening agent is allowed to provide the food product with the desired texture following the disruption of the first thickening agent. Cooling of the first and second thickening agents may be provided during their thickening or gel formation to enhance or accelerate same.

In preferred embodiment, either the first or second thickening agents, or both, constitute gelling agents.

In preferred embodiments, the increase in viscosity of the food product caused by one or both of the thickening agents may be enhanced by a decrease in temperature.

In one embodiment, chemical additives may be added to the heated food product matrix to enhance or accelerate thickening or gel formation. These chemical additives are preferably divalent cations. In a particularly preferred embodiment, calcium chloride is used.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

It was determined by the inventors that the need for a food product to meet demanding rheological requirements during the packaging process may require more than one stage of thickening or gel formation. Accordingly, a thickener composition was developed which includes two or more different gels or thickening agents. As an example, a relatively slow-setting gel or thickener with desirable finished product characteristics may be used together with a relatively rapid-setting gel or thickener which aids in packaging and assists in forming the desired packaged shape. Preferred gel or thickener compositions and exemplary processes for using them are described below.

It was found that a complication in attempting to gel or thicken a product too quickly is that further deformation and/or disruption of the gel during the packaging process may damage the gel, resulting in a fractured and unacceptable finished product. The surface texture of such a product may be granular, lumpy, non-uniform and cosmetically unappealing in nature, and may include cracks or fissures indicating a loss of slice integrity (see, e.g., FIGS. 2–3). Also, internally, the food matrix may be discontinuous with unacceptable texture and mouth feel (e.g., too grainy, brittle or lumpy) and with free fluid. However, it has been discovered that the use of another, slower-setting gel or thickener may conceal or "mask" this breakage or disruption, resulting in a food product with a smoother consistency and texture (see, e.g., FIG. 1) In other words, in the preferred embodiment the present invention provides a preliminary gel or thickener formation which facilitates continuous packaging and enables the food product to take shape in the packaging material, as well as a second gel or thickener formation which does not gel or thicken until after the final shape is formed and the packaging is complete. While the precise chemistry is not understood, it is believed that constituents of the second gel or thickener surround the granular components of the first gel or thickener and "smooth" out their appearance, resulting in a firmer and more finished food product texture.

A brief description of gelation and gel formation follows, as known to those of ordinary skill in the art. This description is not intended to discount in any way the potential for using a thickening agent as opposed to a gel in any appropriate instance.

Gelatin has proven particularly effective as a slow-setting gelling agent for use with the exemplary food products whose preparation is discussed in Examples 1–3, below. Gelatin is a well-known, proteinaceous gel-forming agent extracted from animal collagen tissue. The collagen monomer is a rod-like molecule with dimensions of about 260 nm long and 1.5 nm wide, and with a molecular weight of less than 300,000. Each rod is composed of three chains of molecular weight about 95,000, each coiled in a three-fold left-handed helix with three residues per turn.

The process of gel formation is called gelation. Gelation sufficient for the first stage of a multi-stage gel forming process does not usually provide sufficient finished product firmness. Gelatin is preferably used in concentrations of between about 1% and 10%, depending upon the desired firmness of the finished product.

Gelatin has the ability to form a firm gel that is also thermoreversible. Although gelatin forms excellent gels, it is also a slow gel-forming agent. It is well established that the gel strength of a gelatin gel increases only slowly with time. Gelatin requires a relatively low temperature (e.g., 0° C.–35° C.) for gelling, as compared to other gelling agents. Gelatin remains soluble when heated and provides a clear gel even at high concentrations. The gelatin used in the current invention, described below, produces a firm gel with desirable characteristics for controlled portions of jelly, sauces, and dessert gels. Other gelatins may prove useful with other food products.

Additional ingredients such as fruit solids, sugar, corn syrup solids, whey solids, starch, oil, colors, or flavors may be added to the gels/thickening agents described below, as needed, as long as no interference with the multiple gel formation described below is observed.

As to rapid-forming gels or thickening agents, polysaccharides are widely used to gel the aqueous phase. Most polysaccharide materials, such as starches and gums, provide viscosity and thickening at elevated temperatures.

Thickened polysaccharide solutions depend upon the properties of disordered polymer chains interacting via entanglements. Rigid gel structure is due to more specific chain interactions. This chain interaction may be induced by a reduction in water activity, pH adjustment, ionic interactions, or by freeze thawing. Polysaccharide interactions occur by means of the interpenetrating of flexible coils, association of rigid rods, and the formation of interchain tertiary structures. Junction zones produce interchain tertiary structures. Examples include calcium-mediated gelation of alginates and pectins. Carrageenan gels form double helical junction zones.

The literature (see Industrial Gums, Academic Press, Inc., 1993, R L Whistler, J N BeMiller, $3^{rd}$ ed.) indicates when two chains form a junction zone at one place along their chain lengths, other perhaps distant reaches of each chain can collide and form a junction zone with other molecules. This process of random junction zone formation between different molecules can continue until many, if not most, of the polysaccharide molecules become involved in a great three-dimensional network that may fill the entire vessel. The gel will possess a strength dependent on the strength of intermolecular bonding at the junction zones. If the bonding is weak, it may be broken and the total gel structure disrupted by stirring. In this case the weak gel is said to be thixotropic. The forces of stirring supplies sufficient energy to break many, or even most, of the junction zones and the viscosity of the dispersion decreases. When stirring is stopped, the molecules may again collide in normal translation, or Brownian-like motion, and junction zones re-establish to some degree.

This same literature indicates that when the junction zones are of greater strength, a more identifiable gel forms that may not be easily broken by stirring and may be strong enough that, under force, the gel will separate or cleave as seen with gelatin gels. Such a gel may be reliquified if the junction zone energies are low enough that simple heating may energize the molecules sufficiently to cause them to tear apart from each other. Once formed, a gel may undergo lengthening of its junction zones by the molecules sliding over each other or by simply moving together at the junction zone ends so as to increase the length of the zone. This will cause a tightening of the overall network structure and a decrease in the water-filled spaces between the molecules. Hence, water is exuded from the gel to produce syneresis, as is commonly observed.

This discussion suggests that a weak gel can form, be broken, and reform to some degree, but that a firmer gel may not reform without reheating or forming some additional type of gel.

Cation-mediated polysaccharides, such as alginates, low methoxyl pectin and carrageenans, are able to produce rapid-setting gels at high temperatures. Rapid-forming gelling agents have the characteristic of forming gels at high temperatures, preferably above 65° C.

Some of the types of rapid gel forming agents that may find advantageous use with the present invention include konjac, carrageenan, and low methoxyl pectin. Konjac is the generic name for the flour formed from grinding the tuber of the Amorphophallus konjac plant. It is classified as a glucomannan. Its average molecular weight is between 200,000 and 2,000,000, which accounts for its high pseudoplastic viscosity. Konjac is synergistic with kappa carrageenan, xanthan, and locust bean gum to form thermally reversible gels. Konjac is a non-ionic polysaccharide and its gel structure is not affected by calcium, potassium, or sodium.

Pectin is a structural polysaccharide found in all higher plants. All pectin contains segments of galactopyranosyluronic acid units with some of the carboxyl groups esterified with methanol. If pectin is treated with ammonia, some of the methyl carboxylate groups are converted in carboxamide groups, resulting in an amidated pectin. Pectins with a degree of esterification (DE) greater than 50 are called high ester pectins or high methoxyl (HM) pectins, while those with DE less than 50 are called low ester pectins or low methoxyl (LM) pectins. HM pectins require high concentrations of soluble solids and a low pH to gel. LM pectins require only the presence of divalent cations. A rapid gel or thickener formation can be observed when dissolved LM pectin is combined with a divalent cation such as calcium.

Carrageenan may also be used as a rapid-setting gel or thickener. Use of carrageenan from seaweeds (i.e., Irish moss) for food thickeners dates back hundreds of years. Carrageenan is a group of sulfated galactans extracted from red seaweeds. There are three major fractions of carrageenans: kappa, iota, and lambda. The fractions contain the same alternating unit backbone but vary in the extent and position of sulfation. Kappa and iota carrageenan have the ability to form thermoreversible gels upon cooling of hot aqueous solutions containing various salts. Kappa carrageenan gels most strongly with potassium ions. Iota carrageenan gels most strongly with calcium ions, and lambda does not form gels.

According to the present invention, the amount of rapid gel-forming or thickening agents used depends upon the required firmness for the particular food product being extruded into the packaging material. It is desirable to have sufficient material present to allow filling at above 65° C., although lower temperatures are acceptable. An additional restraint is that the formation of the first (rapid-setting) gel or thickener should not be so close to the second gel or thickener formation that the second gel or thickener formation is disrupted. Levels of between 0.2% and 2% for the first setting gel or thickener were found acceptable. (Unless otherwise stated, all percentages given here are weight percentages.) Addition of a cationic source such as calcium or potassium may be required to achieve an appropriate initial set. In this case, sufficient dispersion is recommended for an even gel or thickener to form.

Starch is the major reserve polysaccharide of higher plants, where it occurs mainly in storage organs such as seeds, tubers, or roots. It exists as water insoluble spherical granules. The granules can be fractionated into two major components called amylose and amylopectin. Amylose is a linear polymer of a(1->4) linked D-glucose. Amylopectin contains chains of a(1->4) linked D-glucose but is a multiple branched structure with branches linked at position 6. Solutions of starch granules swell with heating, undergoing a process called "gelatinization" at sufficiently high temperatures. Swelling leads to solubilization of amylose. Heating results in porous amylopectin granules suspended in hot amylose solution with little solubilization of the amylopectin occurring. Upon cooling, amylose forms turbid viscoelastic pastes or, at higher concentrations, opaque elastic thermo-irreversible gels.

In addition to thickening and gel formation, polysaccharides interact with each other to various degrees. Locust bean gum reacts with cellulose to result in gel formation. Locust bean gum reacts with agar, and agar with carrageenan to increase gel strength. Xanthan and tara gum react with locust bean gum to increase gel strength. Konjac flour reacts with xanthan to gel at a higher temperature than konjac alone. At times, interactions are unfavorable for thickening and gel formation, causing a reduction in these properties.

For the present invention, which involves multiple gelling or thickening events or stages, the thickening/gelling agents should be compatible. In other words, the gel or thickening formation of one preferably does not detract from the gel formation of the other. As one example, gelatin may not gel properly with substances that block interaction of helices. Also, to provide different gel stages, thickening agents which do not gel simultaneously should be selected, such as those whose gel or thickener formation is separated by temperature and/or time.

Three examples will now be described in which two-stage gel/thickening compositions were used to increase the viscosity of naturally fluidic or runny food products.

EXAMPLE 1

Figure 10:
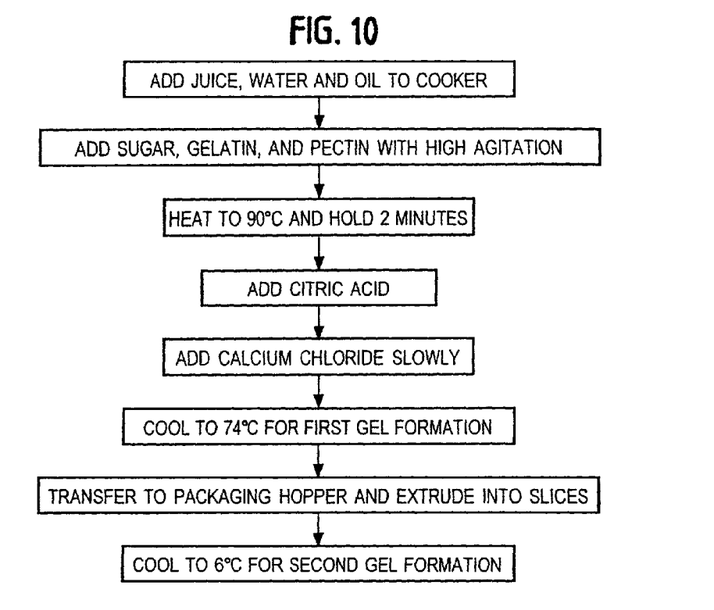
FIGS. 10–12 are schematic diagrams showing process steps for forming exemplary food products using compositions according to preferred embodiments of the present invention.

Using the present invention, an individually wrapped jelly slice was made according to the following formula (numbers in percentages, by weight), as further shown in FIG. 10:

| | | |
|---|---|---|
| Grape juice concentrate | 27 | Frozen retail commerical brand |
| Pectin (Unipectin AMP 285) | 1.5 | SKW, Atlanta, Georgia 30340 |
| 250 bloom gelatin | 3 | Germantown Mfg. Inc. Westchester, PA 19380 |
| Sugar (table sugar) | 40 | |
| Crisco Vegetable oil | 1.4 | |
| Citric acid (50% solution) | 0.4 | ADM Shawnee Mission, Kansas 66207 |
| Calcium chloride solution (45%) | 0.5 | Rhodia Labs, Madison, WI |
| Water/steam | 26.2 | |

Figures 3, 4, 5:
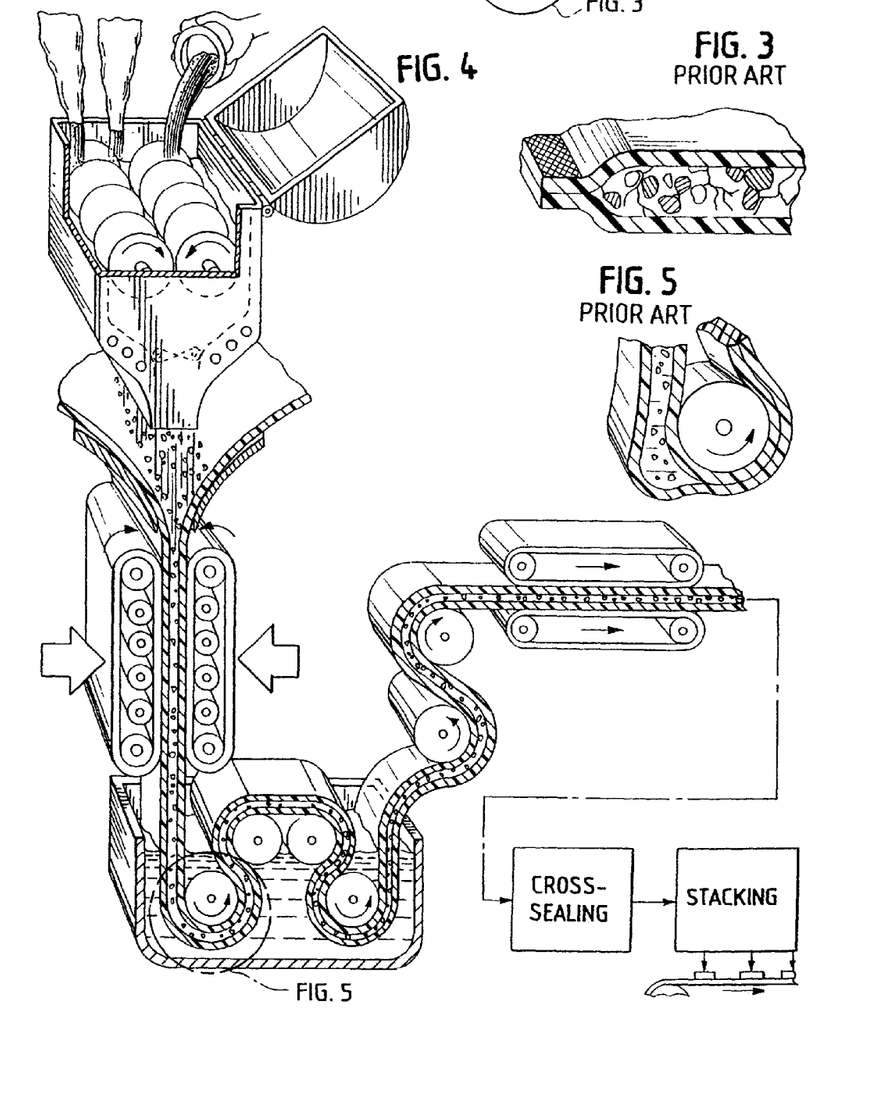
FIG. 3 is an enlarged view of the circled portion of FIG. 2, highlighting the granular, inconsistent texture of the slice-shaped food product.
FIG. 4 is a perspective view showing process steps in one preferred embodiment of the present invention.
FIG. 5 is an enlarged view of the circled portion of FIG. 4, showing the bulging problem which may occur if an attempt is made to package food product which is too viscous using packaging equipment of the type described here.
Figures 6, 7, 8, 9:
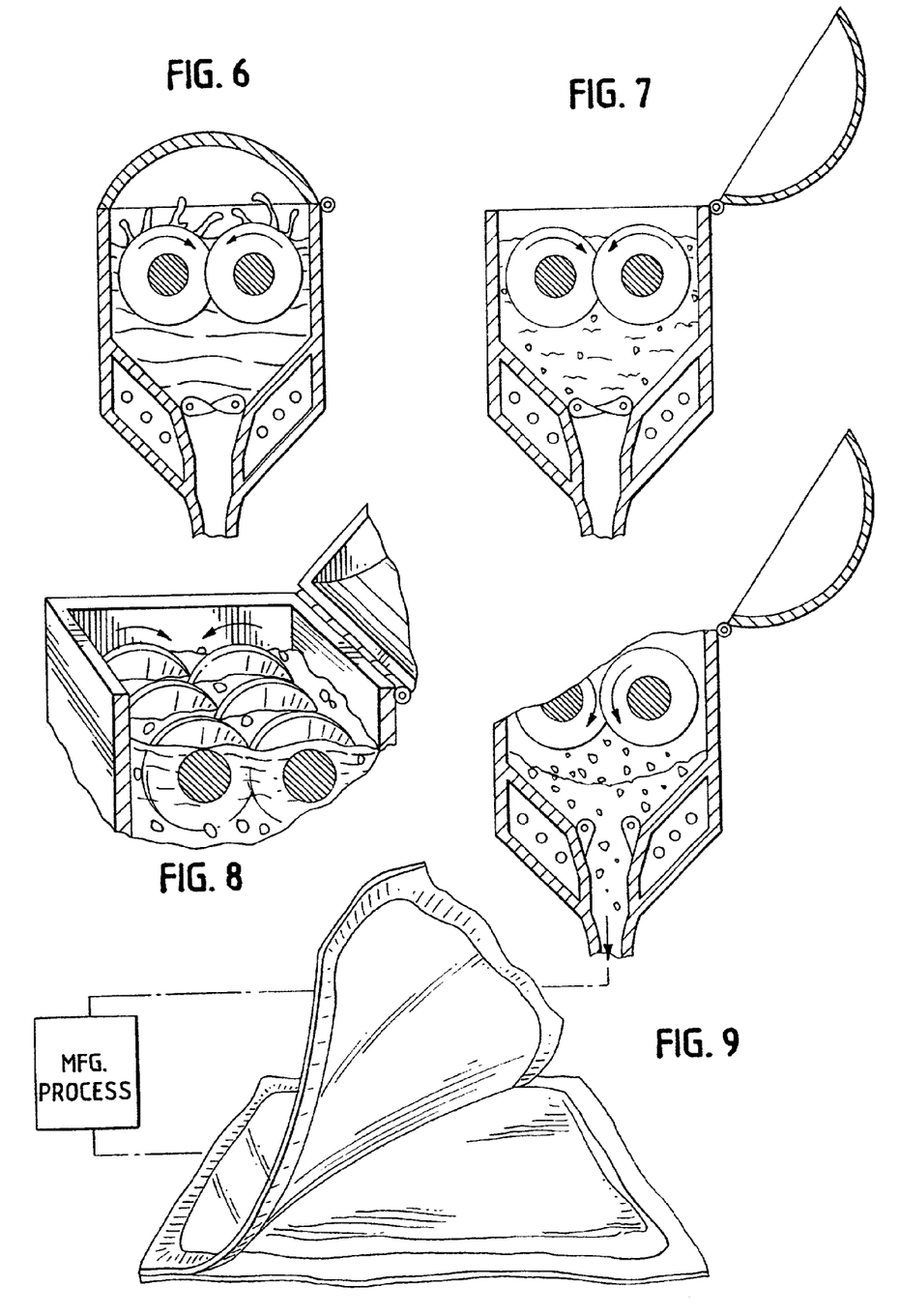
FIGS. 6 and 7 are side views of an open and closed blender/cooker, respectively, used in performing the process according to one preferred embodiment of the present invention.
FIG. 8 is a partial view of the blender/cooker shown in FIG. 7.
FIG. 9 is a schematic view of one preferred process according to the present invention.

The pectin and gelatin was dry blended by hand with 5 times their weight of sugar. The dry blend was then added slowly to the juice and water while agitating in a 200-pound capacity Rietz-style twin screw horizontal auger cooker (available from Green Bay Machinery, Green Bay, Wis.), as shown in FIG. 4. The amount of water used was reduced by the anticipated amount of steam to be added during heating and an amount to dilute the calcium chloride at a 1:10 ratio. Typical steam values are from 5–10% of the finished product weight dependent on finished cook temperature. Vegetable oil was added to reduce foam formation. The remainder of the sugar was added and the mixture was heated with direct steam (FIG. 6) to a temperature of 90° C. and held for 2 minutes. The heating from the cold tap water temperature to final cook temperature was about 12–20° C. per minute. Heating was also accomplished with agitation by the twin screw auger rotating at about 60–180 rpm. After the final cook temperature and an additional hold at that temperature of 2 minutes during fast agitation, the auger speed was reduced to about 20–40 rpm. The citric acid solution was then slowly added at about 4 mls. per second. Next, the calcium chloride solution is added at about 1 ml. per second. Calcium chloride solution was added very slowly to avoid localized gel formation. The blend is allowed to decrease, in temperature to about 74° C. until the gelation causes thickening sufficient to extrude into the packaging equipment, as shown in FIGS. 7–8. As may be seen in FIGS. 7–8, while gelling/thickening has occurred, the texture of the food product is somewhat lumpy, granular and non-uniform, and is not desirable as a finished, consumer-ready product, due to the dynamic mixing process. The cooling process takes about 5–15 minutes with slow speed agitation as described above.

The jelly food product may be gravity-fed from the blender/cooker into a holding tank and then, using a positive displacement pump, may be transported into a fill tube for entry into the packaging material. Following entry of the jelly into the packaging film, the film was formed into a flat ribbon and cooled in a cold water trough of about 6° C. The ribbons were then further shaped and further flattened, crimped into slice portions, and the crimped areas were cut to form individually wrapped slices. The slices were stacked and allowed to cool under refrigeration temperatures until the desired finished product firmness was obtained. The packaging operations recited in this paragraph may be performed by a slice-shaping and packaging machine as described in U.S. Pat. No. 5,440,860 to Meli, et. al. whose disclosure is incorporated herein by reference, and as generally shown in FIGS. 4 and 9.

Figure 1:
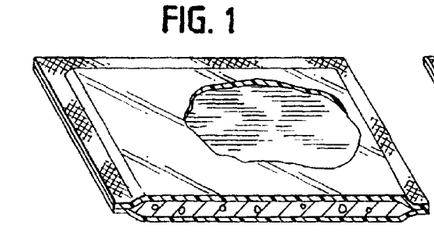
FIG. 1 is a perspective view of a food product in slice form as provided by the present invention, having a smooth consistency and texture, and encapsulated within a plastic film.
Figure 2:
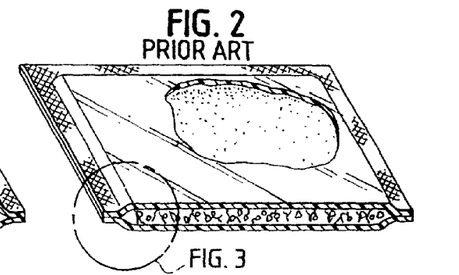
FIG. 2 is view similar to FIG. 1 of a slice-shaped food product having a less desirable, inconsistent, more brittle and granular texture, as may be caused by use of a relatively rapid-setting gel or thickener in the absence of also using a relatively slow-setting gel or thickener.

It will be understood that disruption of the rapid-setting pectin gel by this packaging machinery will occur, otherwise causing the jelly to lose its smooth texture and appropriate consistency. However, the slow-setting gelatin will provide a finished, appropriately textured jelly slice, as shown in FIG. 1, which is firm enough to maintain its integrity in a slice form while either consuming the product directly or using it in some other application such as with a sandwich.

It is noted that attempts to package jelly slices using the Meli packaging machinery in the absence of a rapid-setting gel have proven unsuccessful, as the runny jelly ribbon catches and bulges, and refuses to wind around the rollers, as shown in FIG. 5. Increased viscosity needs to be imparted to the food product to provide weight control and permit flattening of the food product within the packaging film.

EXAMPLE 2

Figure 11:
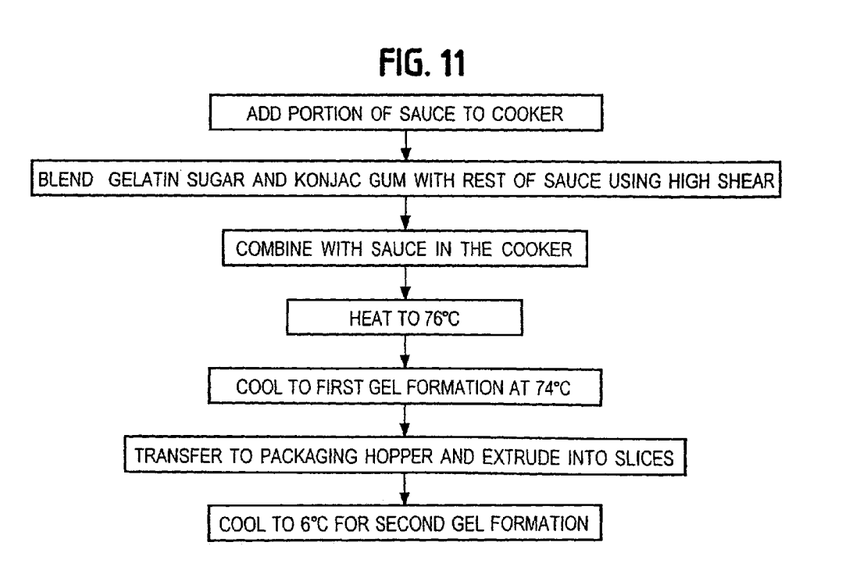

An individually wrapped slice of barbeque sauce with good melting properties was made according to the present invention, using this formula, as further shown in FIG. 11:

| | | |
|---|---|---|
| Prepared barbeque sauce | 90.5 | Commerically available |
| 250 bloom gelatin | 6 | Germantown Mfg., Inc. Westchester, Pa 19380 |
| Konjac flour (Nutrical ® Konjac powder) | 1.5 | FMC Corp., Philadelphia, PA |
| Sugar (table sugar) | 2 | |

One-half of the barbeque sauce was added to a 200-pound capacity Rietz-style twin screw horizontal auger cooker (Green Bay Machinery, Green Bay, Wis.). The dry ingredients were blended together and mixed into the remainder of the barbeque sauce using a wire whip on a Hobart mixer (Blakeslee B-20, GS Blakeslee & Co., Chicago, Ill.). The sauce and gum preparation from the Hobart mixer was then combined with the sauce in the cooker. The temperature was increased using a steam jacket at a rate of increase of about 2–5° C. per minute to 76° C. using medium agitation at about 60–180 rpm. After this cook temperature was reached, the mixture was cooled to about 74° C. using slow agitation at about 20–40 rpm until sufficient gelation occured to allow packaging. The cooling process takes about 5–15 minutes with slow agitation as described above. The material was then transferred to the extruder and packaging machine described in the '860 patent, and extruded into the packaging film. The film with the food product inside was then flattened, forming a continuous ribbon of sauce. The ribbon was cooled in a cold water trough of about 6° C. The ribbon was crimped into portions and the portions cut into individually wrapped slices. The slices were stacked and allowed to cool until acceptable firmness and good film separation were achieved.

Finished slices were firm enough to handle and would melt sufficiently to enrobe the material to which they were applied, without flowing off of the material. Using a barbeque sauce dry mix in place of the liquid preparation worked equally well and allowed the use of direct steam heating.

EXAMPLE 3

Figure 12:
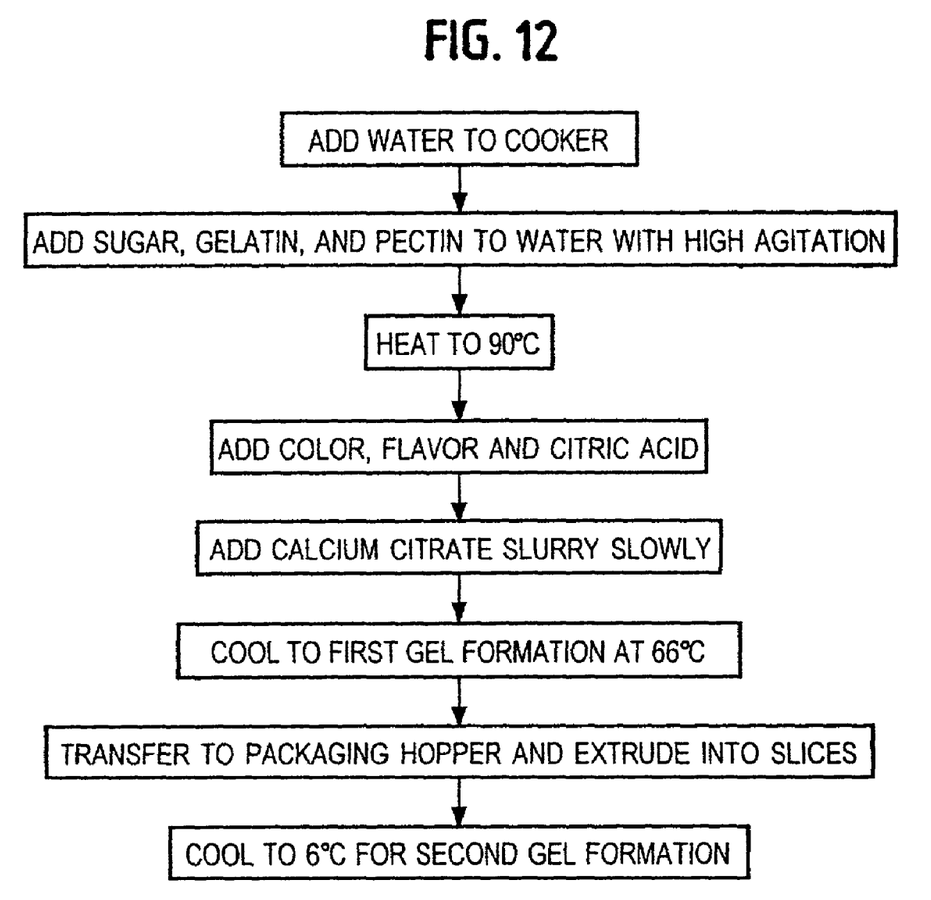

An individually wrapped dessert gel with sufficient integrity and dryness for handling was made according to the present invention, using this formula, as further shown in FIG. 12:

| | | |
|---|---|---|
| 250 bloom gelatin | 4.0 | Germantown Mfg., Inc., Westchester, PA 19380 |
| Pectin (Unipectin AMP 285) | 1.5 | SKW, Atlanta, Georgia 30340 |
| Table sugar | 30 | |
| Tri-calcium citrate | 0.2 | GBI, Rolling Meadows, IL 60008 |
| Citric acid (50% solution) | 0.3 | ADM, Shawnee Mission, KS 66207 |
| Color (FD&C Red #40) | 0.005 | Hilton Davis, Cincinnati, OH 45237 |
| Flavor (N&A Strawberry FC9120) | 0.5 | T. Hasegawa USA, Inc. Cerritos, CA 90703 |
| Water/steam | 55.7 | |

The gelatin, pectin, sugar, calcium citrate, flavor and color were dry blended by hand in a plastic bag and added slowly to the cold water in a 200-pound Rietz-style twin screw horizontal auger cooker (Green Bay Machinery, Green Bay, Wis.). The agitation is set high (about 60–180 rpm) to avoid lumping. The water was reduced by the anticipated amount of steam to be added and by one pound of water needed to slurry the calcium citrate. Typical steam values are from 5–10% of the finished product weight, dependent upon finished cook temperature. The mixture was cooked with high agitation to 90° C. at a rate of increase of 12–20° C. per minute and held for 2 minutes with continued high agitation. Next, the citric acid solution was added, followed by color and flavor. The mixture was then cooled to about 66° C. until sufficient gel formation was developed to facilitate packaging. This cooling process takes about 5–15 minutes, at slow speed agitation (about 20–40 rpm). The material was then transferred to the packaging device described above and extruded into the packaging film. The film was then flattened, forming a continuous ribbon of dessert gel. The ribbon was then cooled in a cold water trough of about 6° C. The ribbon was crimped into portions and the portions cut into individually wrapped slices. The slices were stacked and allowed to cool until acceptable firmness and good film separation were achieved.

Figure 13:
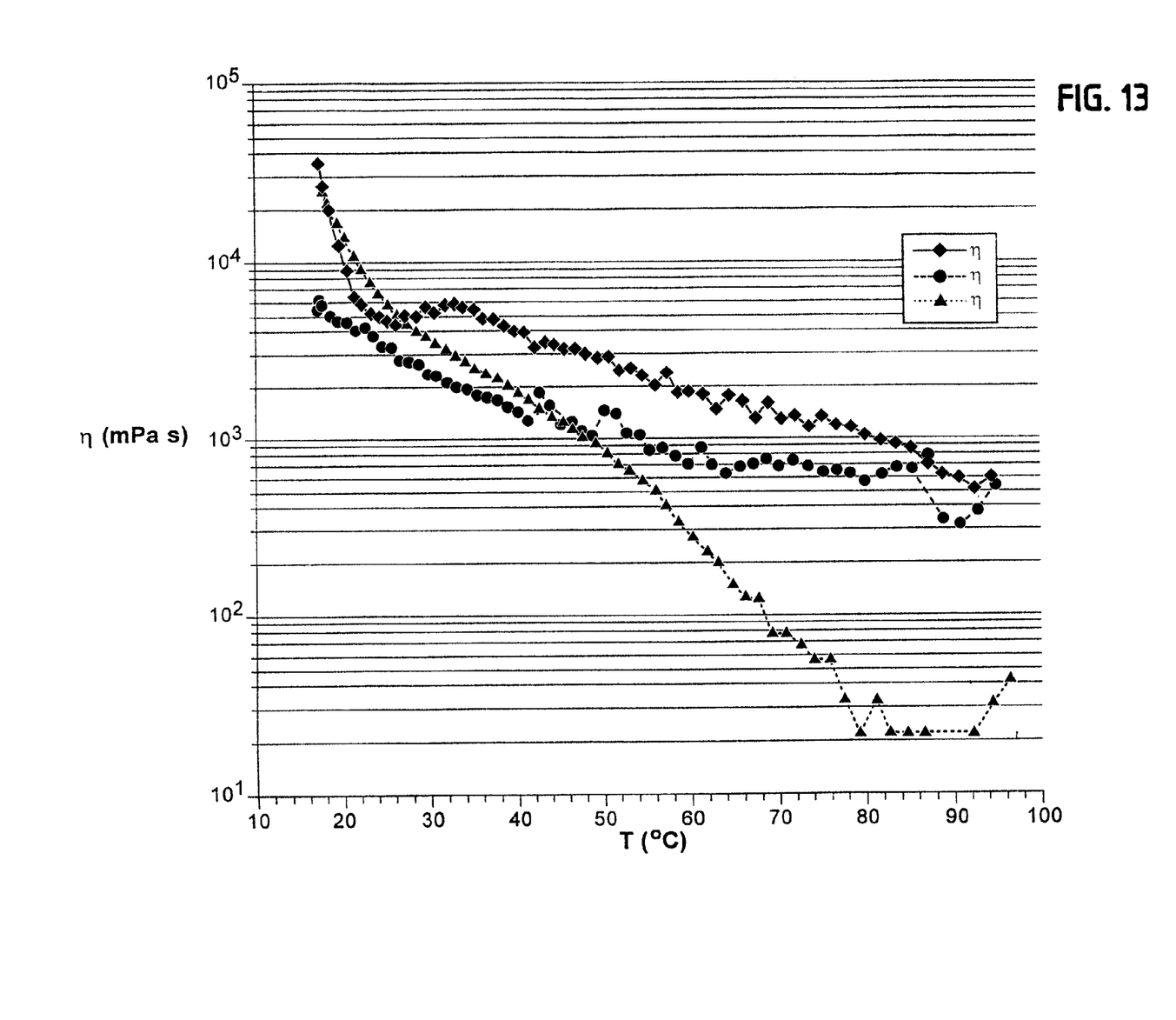
FIG. 13 is a graph of temperature (X-axis, in °C.) versus centipoise (Y-axis, where centipoise is an absolute unit of viscosity in milliPascal-seconds), with increasing units along the Y-axis indicating a thickening or more viscous composition.

Referring to FIG. 13, there is shown a graph of temperature (° C.) versus viscosity (in centipoise, or milliPascal-seconds). The diamonds represent a food product with a multi-stage gelling composition according to the present invention (see the formula recited in Exhibit 1, for forming jelly slices). The triangles represent that food product, but without the use of calcium chloride. The circles represent that food product, but without the use of gelatin. As may be seen, the lack of calcium chloride delays thickening, while the lack of gelatin impedes gel formation. As may also be seen, there is an order of magnitude increase in viscosity when the first gel forms. There is also an approximate order of magnitude increase in mixture viscosity as the second gel is forming. As an example, food products according to the present invention have an apparent viscosity (according to the viscotester, Model No. VT550, Haake, USA, Paramus, N.J., used to make the measurements shown in FIG. 13) of about 1,000 centipoise during filling of the food product within the packaging material. On the other hand, the apparent viscosity of the food product during gel formation is about $10^5$ or greater.

Suitable thickening and gel forming agents that may find advantageous use with the present invention include at least: gelatin, xanthan, curdlan, agar, alginates, carrageenans, guar, locust bean, tara, methocel, fenugreek, pectin, gellan, other derivatives of cellulose, and starch.

Suitable temperatures at which the food product is provided to the extruder for insertion into the packaging film ("fill temperature") and at which the food product exits from the cooling bath ("exit temperatures") will generally be known to those of ordinary skill in the art, and vary depending upon the packaging machine used, the processing speed, the film and, of course, the food product and its desired shape and texture. As examples, with regard to the jelly slice formed according to Example 1, above, suitable fill temperatures were found to be in the range of about 70–75° C. and suitable exit temperatures were found to be in the range of about 5–10° C. As further examples, with regard to the barbecue sauce and dessert gel slices of Examples 2 and 3, suitable fill temperatures were found to be in the range of about 70–75° C. and about 65–70° C., respectively, while suitable exit temperature are the same as for Example 1.

Chemical additives, such as calcium chloride or other divalent agents such as other chloride or calcium acidified solutions, may be added to the gels or thickening agents described above for the purpose of accelerating the rate of gelling/thickening, and to bring about gelling/thickening in a more measured and controlled manner.

It will be understood that the present invention may find advantageous use with various types of continuous packaging machines that shape and/or extrude food products, including food products that are shaped into slice, loaf and other forms. In one particularly preferred form, the slices may be hermetically sealed as taught in the '860 incorporated here by reference.

It will also be understood that in its broadest aspects, the present invention is not limited to the use of "gels" or the gelling phenomenon. Instead, any multi-stage thickening agents may be advantageously employed by the present invention, with the different stages being triggered by (e.g.) time or temperature variations or combinations of same, by additive chemical agents, or by other means. Also, combinations of gelling and thickening agents may be employed (e.g., a rapid-setting thickening agent may be combined with a slow-setting gel, or a rapid-setting gelling agent may be combined with a slow-setting thickening agent).

The present invention also provides enhanced weight control over the resulting food product packages. Thus, since the first gel/thickener allows more even filling of the package, little or no variance in weight between packages may be obtained.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

We claim:

1. A food gel to be continuously packaged within a flexible wrapping material and provided with a desired texture and consistency through sequential thickener formation, disruption and reformation, comprising:
   a multi-stage thickening composition comprising compatible first and second thickening agents which thicken at different times during the packaging process;
   the first thickening agent comprising a plant-based or microbial-based gelling agent initially substantially increasing the viscosity of the food gel to facilitate packaging of the food gel, the first thickening agent being disrupted by the packaging process after the food gel has been initially inserted within the flexible wrapping material, the disruption interfering with the desired texture and consistency of the food gel; and the second thickening agent causing the food gel to again substantially increase in viscosity following the disruption of the first thickening agent, masking the disruption of the first thickening agent caused by the packaging process to thereby provide the food gel with the desired texture and consistency.

2. The food gel of claim 1, wherein the food gel comprises a slice and the package comprises a plastic film enclosing the slice.

3. The food gel of claim 2, wherein the slice is hermetically sealed within the plastic film.

4. The food gel of claim 1, wherein the food gel comprises jelly.

5. The food gel of claim 1, wherein the food gel comprises a food sauce.

6. The food gel of claim 1, wherein the first thickening agent comprises low methoxyl pectin.

7. The food gel of claim 1, wherein the first thickening agent comprises Konjac gum.

8. A food gel comprising a food sauce or jelly to be continuously packaged within a flexible wrapping material and provided with a desired texture and consistency through sequential gel formation, disruption and reformation, comprising:

a multi-stage gel composition comprising compatible first and second gelling agents which thicken at different times during the packaging process;

the first gelling agent comprising a polysaccharide initially substantially increasing the viscosity of the food gel to facilitate its packaging, the first gelling agent being disrupted by the packaging process after the food gel has been initially inserted within the flexible wrapping material, thereby interfering with the desired texture and consistency of the food gel;

and the second gelling agent causing the food gel to again substantially increase in viscosity following the disruption of the first gelling agent, masking the disruption of the first gelling agent caused by the packing process and providing the food gel with the desired texture and consistency;

wherein the viscosity of the food gel following gelling of either the first or second gelling agents is about 100,000 centipoise or greater.

9. The food gel of claim 8, wherein the viscosity of the food gel immediately prior to packaging is about 5,000 centipoise or less.

10. The food gel of claim 8, wherein the food gel is a fruit jelly.

11. A process for forming a continuously packaged food gel to be provided with a desired texture using sequential gel formation, disruption and reformation, comprising the steps of:

dispersing a multi-stage gel comprising compatible first and second gelling agents which thicken at different times during the packaging process within other constituents of the food gel, the first gelling agent comprising a polysaccharide and increasing the viscosity of the food gel so as to facilitate its shaping and packaging;

the packaging process disrupting the first gelling agent in a manner that interferes with the desired texture of the food gel;

and the second jelling agent masking the disruption of the first gelling agent caused by the packing process and gelling to provide the food gel with the desired texture.

12. The process of claim 11, wherein the increase in viscosity of the food gel caused by one or both of the gelling agents is enhanced by a decrease in temperature.

13. The process of claim 11, further comprising the step of heating the gelling agents during their dispersion within the other constituents of the food gel.

14. The process of claim 13, further comprising the step of cooling the heated mixture to a temperature sufficient to enhance the ability of the first gelling agent to increase the viscosity of the food gel and facilitate its shaping and packaging.

15. The process of claim 13, further comprising the step of cooling the food gel following its packaging to a temperature sufficient to enhance the ability of the second gelling agent to provide the food gel with the desired texture.

16. The process of claim 11, further comprising the step of adding a chemical to the gelling agents during their dispersion within the other constituents of the food gel to accelerate the increase in viscosity of the food gel.

17. The process of claim 16, wherein the chemical comprises a divalent cation.

18. The process of claim 17, wherein the divalent cation comprises calcium.

19. The process of claim 11, wherein the food gel is extruded into slices by the packaging operation.

20. The process of claim 19, wherein the food gel slices are each hermetically sealed within a plastic film.

21. The process of claim 11, further comprising the steps of:

heating the food gel during the dispersion step to facilitate mixing of the gelling agents within the food gel;

cooling the food gel to a fill temperature at which the food gel is inserted within the flexible wrap, to thereby substantially increase the viscosity of the first gelling agent and, thus, the food gel, to facilitate its shaping and packaging; and further refrigeration of the food gel to an exit temperature at which the food gel exits from the packaging process.

22. The process of claim 21, further comprising a consumption step in which the unpackaged food gel is permitted to melt sufficiently to enrobe a material to which it is applied.

23. The process of claim 22, wherein during the consumption step the viscosity of the food gel is substantially the same as the viscosity of the first gelling agent.

24. The process of claim 21, wherein the fill temperature comprises between about 65°–75° C.

25. The process of claim 21, wherein the exit temperature comprises between about 5°–10° C.

26. A food gel to be continuously packaged within a flexible wrapping material and provided with a desired texture and consistency through sequential thickener formation, disruption and reformation, comprising:

a multi-stage thickening composition comprising compatible first and second thickening agents which thicken at different times during the packaging process;

the first thickening agent comprising a plant-based, microbial-based or animal collagen tissue-based gelling agent initially substantially increasing the viscosity of the food product to facilitate packaging of the food gel, the first thickening agent being disrupted by the packaging process after the food gel has been initially inserted within the flexible wrapping material, the disruption interfering with the desired texture and consistency of the food gel; and the second thickening agent causing the food gel to again substantially increase in viscosity following the disruption of the first thickening agent, masking the disruption of the first thickening agent caused by the packaging process to thereby provide the food gel with the desired texture and consistency.

* * * * *